United States Patent
Chiu et al.

(10) Patent No.: US 10,539,983 B2
(45) Date of Patent: Jan. 21, 2020

(54) ELECTRONIC DEVICE

(71) Applicant: ASUSTEK COMPUTER INC., Taipei (TW)

(72) Inventors: Szu-Tang Chiu, Taipei (TW); Sin-Fei Lai, Taipei (TW); Chih-Kuang Lin, Taipei (TW); Wai-Tong Chan, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/031,593

(22) Filed: Jul. 10, 2018

(65) Prior Publication Data

US 2019/0018456 A1    Jan. 17, 2019

Related U.S. Application Data

(60) Provisional application No. 62/530,855, filed on Jul. 11, 2017.

(30) Foreign Application Priority Data

Jun. 1, 2018    (CN) .......................... 2018 1 0559028

(51) Int. Cl.
    *G06F 1/16*    (2006.01)
    *G06F 1/18*    (2006.01)
    *G06F 1/20*    (2006.01)

(52) U.S. Cl.
    CPC ............ *G06F 1/1656* (2013.01); *G06F 1/182* (2013.01); *G06F 1/20* (2013.01)

(58) Field of Classification Search
    CPC .......... G06F 1/1656; G06F 1/182; G06F 1/20
    See application file for complete search history.

(56) References Cited

U.S. PATENT DOCUMENTS

| 5,825,617 A * | 10/1998 | Kochis .................. G06F 1/1626 361/679.43 |
| 7,944,700 B2 | 5/2011 | Wang et al. |
| 9,614,942 B2 * | 4/2017 | Eremenko ........... H04M 1/0254 |
| 9,717,045 B2 * | 7/2017 | Eremenko ......... H04W 52/0203 |
| 9,929,515 B2 * | 3/2018 | Eremenko ............ H01R 13/665 |

(Continued)

FOREIGN PATENT DOCUMENTS

| CN | 2482128 Y | 3/2002 |
| CN | 1883243 A | 12/2006 |

(Continued)

*Primary Examiner* — Hoa C Nguyen
*Assistant Examiner* — Keith DePew
(74) *Attorney, Agent, or Firm* — Muncy, Geissler, Olds & Lowe, P.C.

(57) ABSTRACT

The present disclosure provides an electronic device. The electronic device includes a casing and a detachable unit. The casing includes an opening. The detachable unit is selectively disposed in the opening. The detachable unit includes a recognizing element. The detachable unit is provided for the electronic device provided in the present disclosure. In addition to having an electromagnetic shielding effect, the detachable unit can further provide various different functions, such as cooling, storage, display, communication, and accommodation. A user selects different detachable units according to needs. Therefore, the electronic device provided in the present disclosure helps improve user experience.

7 Claims, 10 Drawing Sheets

(56) References Cited

U.S. PATENT DOCUMENTS

| | | | |
|---|---|---|---|
| 10,084,896 B1* | 9/2018 | Cho | H05K 5/0295 |
| 10,162,388 B2* | 12/2018 | Eremenko | G06F 1/1658 |
| 2007/0030638 A1* | 2/2007 | Rumney | G06F 1/18 |
| | | | 361/679.33 |
| 2007/0064385 A1* | 3/2007 | Paul | G06F 1/187 |
| | | | 361/679.4 |
| 2007/0279852 A1* | 12/2007 | Daniel | A44C 5/0007 |
| | | | 361/679.03 |
| 2008/0259551 A1* | 10/2008 | Gavenda | G06F 1/16 |
| | | | 361/679.31 |
| 2009/0268386 A1 | 10/2009 | Lin | |
| 2010/0097764 A1 | 4/2010 | Iikubo | |
| 2011/0085294 A1* | 4/2011 | Jacobs | G06F 1/1684 |
| | | | 361/679.37 |
| 2011/0157815 A1* | 6/2011 | Lin | G06F 1/20 |
| | | | 361/679.48 |
| 2015/0277491 A1* | 10/2015 | Browning | G06F 1/1632 |
| | | | 361/679.44 |
| 2015/0277503 A1* | 10/2015 | Eremenko | G06F 1/1658 |
| | | | 361/679.4 |
| 2015/0288801 A1* | 10/2015 | Fishman | H04B 5/0037 |
| | | | 455/557 |
| 2016/0041582 A1* | 2/2016 | Kim | G06F 1/1605 |
| | | | 361/679.22 |
| 2016/0259514 A1 | 9/2016 | Sang et al. | |
| 2017/0282060 A1 | 10/2017 | Wang et al. | |

FOREIGN PATENT DOCUMENTS

| | | |
|---|---|---|
| CN | 20375663 U | 11/2013 |
| CN | 203733183 U | 7/2014 |
| CN | 104023500 A | 9/2014 |
| CN | 204360296 U | 5/2015 |
| CN | 105549705 A | 5/2016 |
| CN | 105639811 A | 6/2016 |
| CN | 105889721 A | 8/2016 |
| CN | 105892973 A | 8/2016 |
| CN | 205864959 U | 1/2017 |
| CN | 106658272 A | 5/2017 |
| TW | 200901906 A | 1/2009 |
| TW | 200944999 A | 11/2009 |
| TW | M491451 U | 12/2014 |
| TW | M526096 | 7/2016 |
| TW | 201734716 A | 10/2017 |

* cited by examiner

ELECTRONIC DEVICE

CROSS-REFERENCE TO RELATED APPLICATION

This application claims the priority benefit of provisional application Ser. No. 62/530,855, filed on Jul. 11, 2017, and China Patent Application No. 201810559028.7 filed on Jun. 1, 2018. The entirety of the above-mentioned patent application is hereby incorporated by reference herein and made a part of the specification.

BACKGROUND OF THE INVENTION

Field of the Invention

The present disclosure relates to an electronic device, and in particular, to an electronic device including a detachable unit.

Description of the Related Art

Due to consideration of electromagnetic shielding and a security issue, to design heat dissipation holes or select the suitable material of a housing of an electronic device is significantly limited. For example, the housing of the electronic device is usually composed of metal material, and it is not appropriate to form an excessively large opening on the housing. Therefore, appearance design of the electronic device is limited.

BRIEF SUMMARY OF THE INVENTION

The present disclosure provides an electronic device. In addition to having an electromagnetic shielding effect, a housing of the electronic device also provides various usage modes by assembling functional modules according to needs of a user.

The present disclosure provides an electronic device. The electronic device includes a casing and a detachable unit. The casing includes an opening. The detachable unit is selectively disposed in the opening. The detachable unit includes a recognizing element.

A housing of a conventional electronic device only provides electromagnetic shielding and cooling functions. Upon comparison, the electronic device of the disclosure includes the detachable unit which not only has electromagnetic shielding effect, but also provides various different functions, such as cooling, storage, display, communication, and accommodation. A user selects different detachable units according to needs. Therefore, the electronic device of the disclosure improves user experience.

Specific embodiments used in the present disclosure are further described with reference to the following embodiments and accompanying drawings.

DETAILED DESCRIPTION OF THE EMBODIMENTS

Specific implementations of the present disclosure are described in more detail below with reference to the schematic diagrams. Advantages and features of the present disclosure become clearer according to the following descriptions and claims. It should be noted that the figures all use very simple forms and non-precise ratios, to conveniently and explicitly help describe an objective of embodiments of the present disclosure.

Figure 1A:
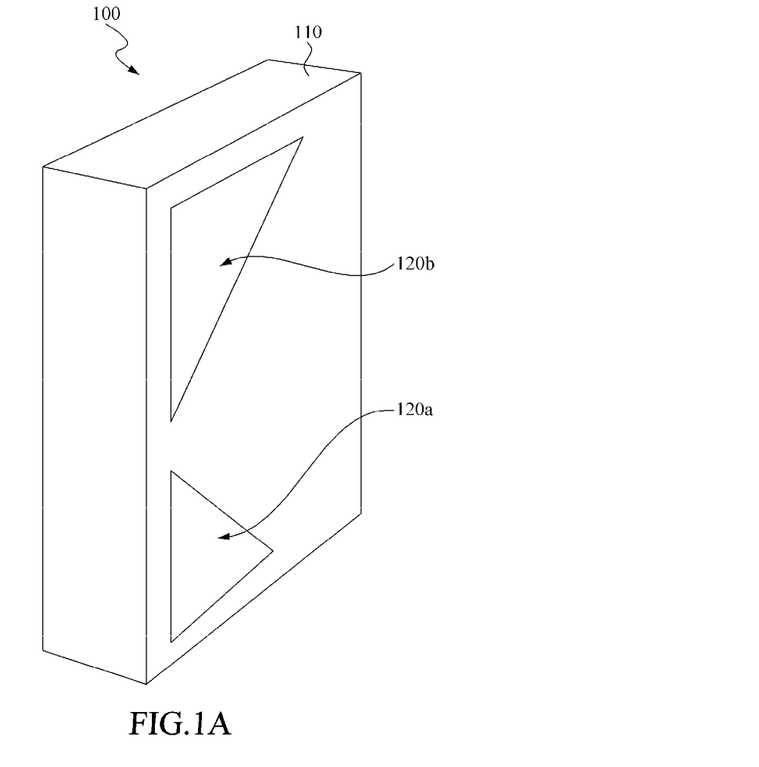
FIG. 1A and FIG. 1B are schematic diagrams of a first embodiment for an electronic device according to the present disclosure.
Figure 1B:
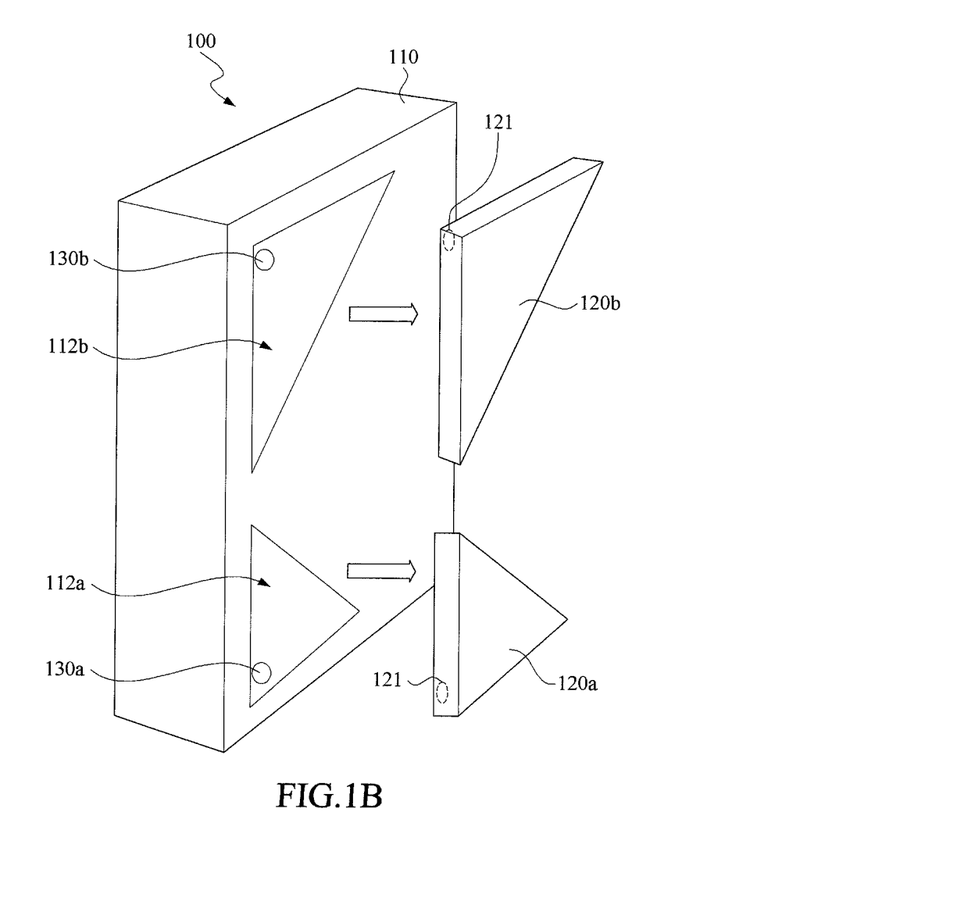

FIG. 1A and FIG. 1B are schematic diagrams of a first embodiment for an electronic device according to the present disclosure. As shown in the figures, the housing 100 includes a casing 110 and at least one detachable unit 120a, 120b. The casing 110 includes at least one opening 112a, 112b. The detachable unit 120a, 120b to selectively cover the opening 112a, 112b. The electronic device is a desktop computer, a laptop computer, a tablet computer, a router, a motherboard, a video card, or the like. In an embodiment, the housing 100 is provided with an electromagnetic shielding function.

In an embodiment, the detachable unit 120a, 120b includes a plurality of fixing elements, and the plurality of fixing elements are detachably fixed to the electronic device to cover the opening 112a, 112b on the casing 110. The fixing element is a magnetic element, an adhered element, a locked element, a buckled element, or the like. However, the present disclosure is not limited thereto. Any detachable fixing element is applicable to the present disclosure.

In an embodiment, the detachable unit 120a, 120b includes a recognizing element 121. The electronic device includes a detector 130a, 130b, disposed in the opening 112a, 112b to detect the recognizing element 121, to determine change or a position of the detachable unit 120a, 120b. Accordingly, a corresponding setting is executed. The user then can install, remove, or replace detachable units 120a, 120b with different functions according to needs.

In this embodiment, the detachable unit 120a, 120b is a shield. The shield is made of an electromagnetic shielding material to provide electromagnetic shielding. If the user needs to improve cooling effect, the user selectively removes the detachable unit 120a, 120b, to increase the dimension of a cooling hole.

In this embodiment, the casing 110 of the housing 100 includes two triangular openings 112a, 112b. In addition, two corresponding detachable units 120a, 120b are disposed on the housing 100. Shapes of the detachable units 120a, 120b roughly correspond to those of the corresponding openings 112a, 112b. The detachable units 120a, 120b are selectively assembled on the casing 110 by the user to cover the openings 112a, 112b. However, the present disclosure is not limited thereto. According to needs, shapes and the number of the openings on the casing 110 is adjusted according to situations.

Figure 2:
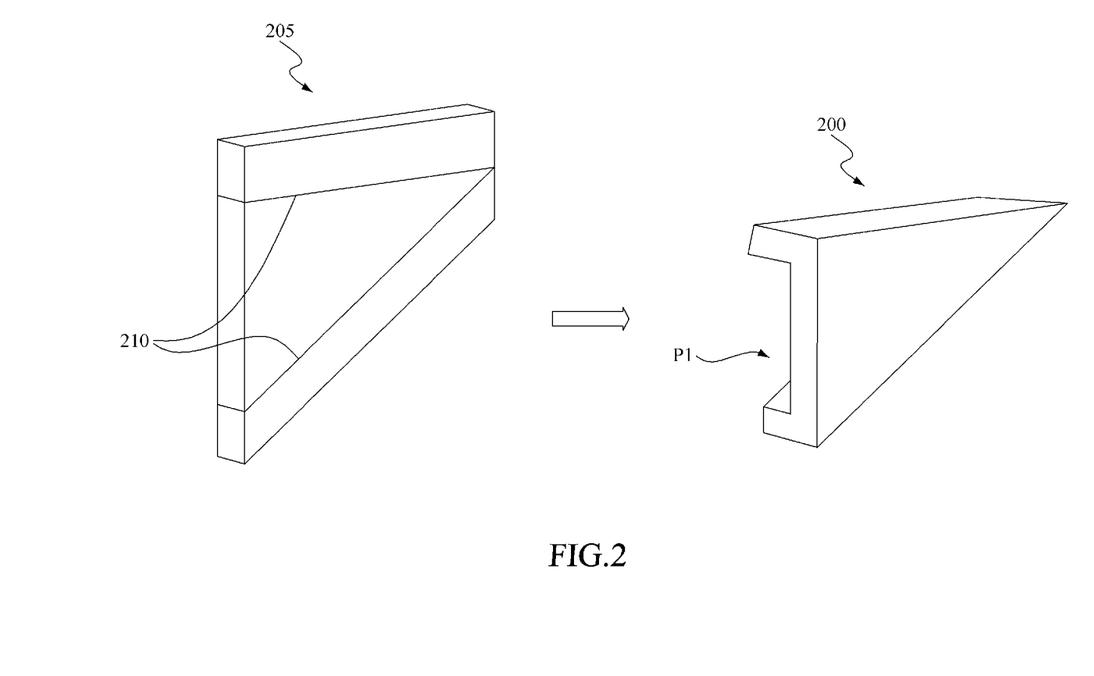
FIG. 2 is a schematic diagram of a first embodiment for a detachable unit of an electronic device according to the present disclosure.
Figure 3:
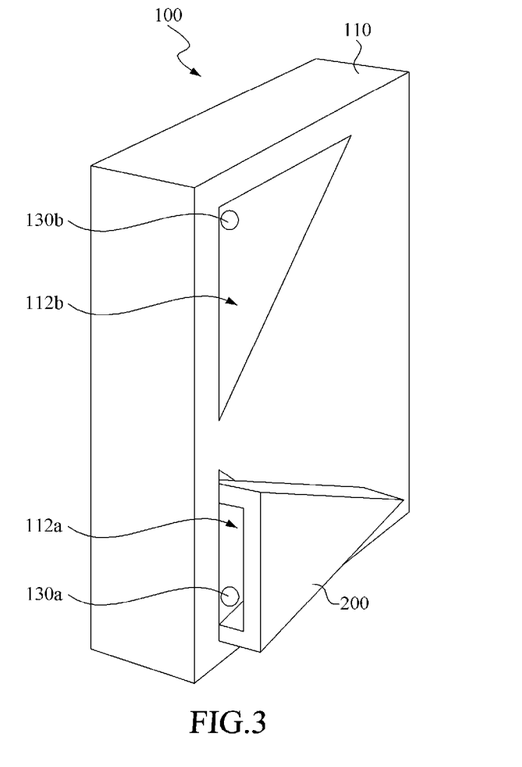
FIG. 3 is a schematic diagram of installing a detachable unit in FIG. 2 on a casing in FIG. 1A.

FIG. 2 is a schematic diagram of a first embodiment for a detachable unit of an electronic device according to the present disclosure. FIG. 3 is a schematic diagram of installing a detachable unit in FIG. 2 on a casing 110 in FIG. 1A. As shown in the figures, the detachable unit 200 in this embodiment is a folded structure, and the folded structure includes a cooling channel P1. The folded structure is formed by folding a shield 205 along creases 210. The detachable unit 200 is detachably fixed to the opening 112a, to provide an electromagnetic shielding effect.

In an embodiment, if the electronic device detects, by using the detector 130a, 130b, the detachable unit 200 (the detachable unit 200 forming the cooling channel P1 through folding shown in FIG. 2) forming the cooling channel P1, the electronic device is immediately switched to operate in a high efficiency mode (such as an overclock mode). Otherwise, the electronic device operates in a normal operating mode.

Figure 4:
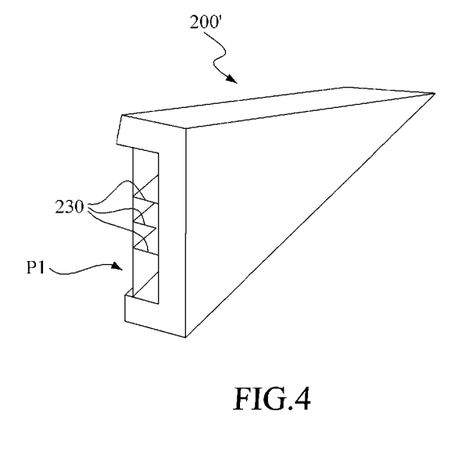
FIG. 4 is a schematic diagram of a second embodiment for a detachable unit of an electronic device according to the present disclosure.

FIG. 4 is a schematic diagram of a second embodiment for a detachable unit of an electronic device according to the present disclosure. Compared with the detachable unit 200 in FIG. 2, a detachable unit 200' in this embodiment is provided with a plurality of heat sinks 230 in the cooling channel P1 to improve a cooling effect.

In the foregoing embodiment, the detachable unit 200, 200' include folded structures, and the cooling channels P1 are formed in the detachable unit 200, 200'. Operational efficiency of the electronic device is adjusted by detecting a type of the detachable unit, for example, by replacing the detachable unit 120a with the detachable unit 200. However, the present disclosure is not limited thereto. In an embodiment, if the electronic device detects a detachable unit forming an optical channel or a sound amplification channel through folding, the electronic device executes a multimedia program.

In this embodiment, the detachable unit 120a, 120b, 200 includes a triangular appearance, to be assembled in the triangular opening 112a, 112b. However, the present disclosure is not limited thereto. The numbers and shapes of the openings 112a, 112b formed on the casing is adjusted according to actual needs. Sizes and shapes of the openings 112a, 112b do not need to be consistent. In addition, the number of detachable units 120a, 120b, 200, 200' is not limited to being equal to the number of the openings 112a, 112b.

Figure 5:
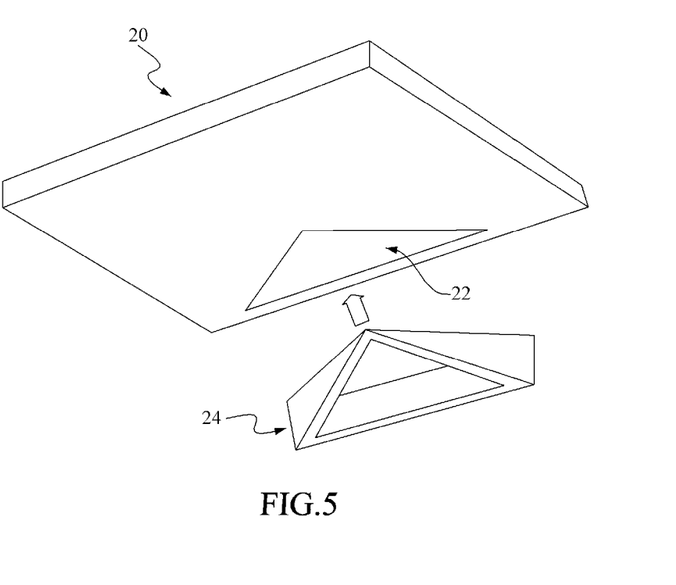
FIG. 5 is a schematic diagram of a third embodiment for a detachable unit of an electronic device according to the present disclosure.

FIG. 5 is a schematic diagram of a third embodiment for a detachable unit of an electronic device according to the present disclosure. As shown in the figure, the detachable unit 24 is detachably fixed below the electronic device 20, and an opening 22 corresponding to the below of the electronic device 20 is used as a support frame to adjust an inclination angle of the electronic device to match a use behavior of the user.

Figure 6:
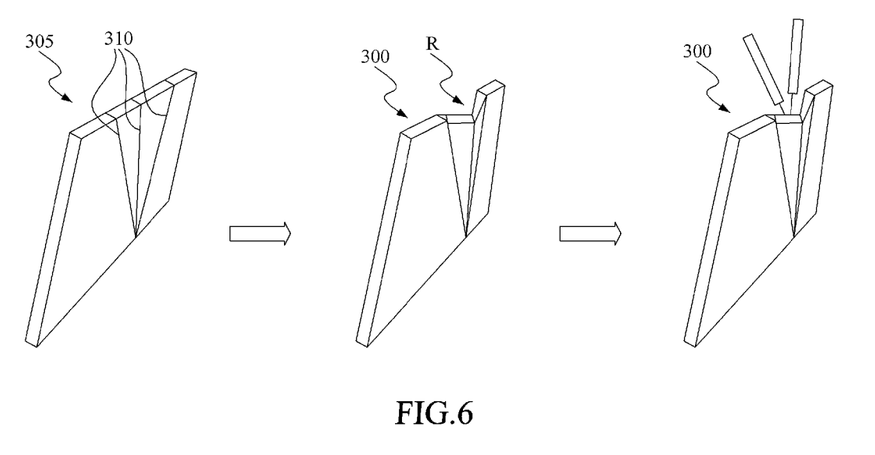
FIG. 6 is a schematic diagram of a fourth embodiment for a detachable unit of an electronic device according to the present disclosure.

In the foregoing embodiment, shapes of the detachable units 120a, 120b, 200, 200', 24 correspond to shapes of the openings 112a, 112b, 22 in which the detachable units 120a, 120b, 200, 200', 24 are installed. However, the present disclosure is not limited thereto. FIG. 6 is a schematic diagram of a fourth embodiment for a detachable unit of an electronic device according to the present disclosure. As shown in the figure, the detachable unit 300 includes a folded structure. The folded structure is formed by folding a shield 305 along creases 310 to form accommodation space R. The detachable unit 300 is detachably fixed to the casing around the opening, for the user to place an article, such as a screw driver. In an embodiment, the detachable unit 300 is fixed to the casing around the opening in a magnetic manner.

Figure 7A:
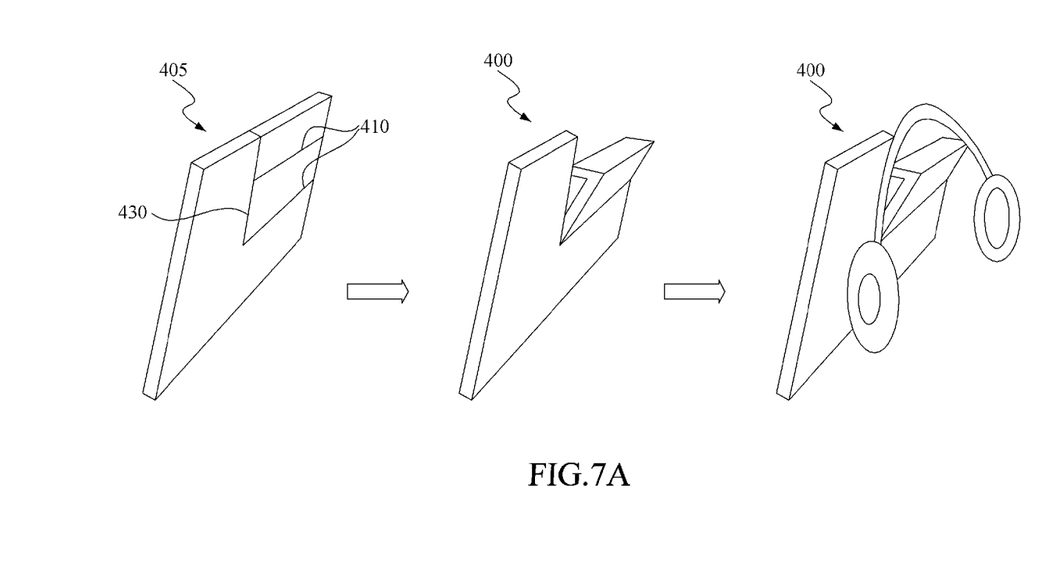
FIG. 7A and FIG. 7B are schematic diagrams of a fifth embodiment for a detachable unit of an electronic device according to the present disclosure.
Figure 7B:
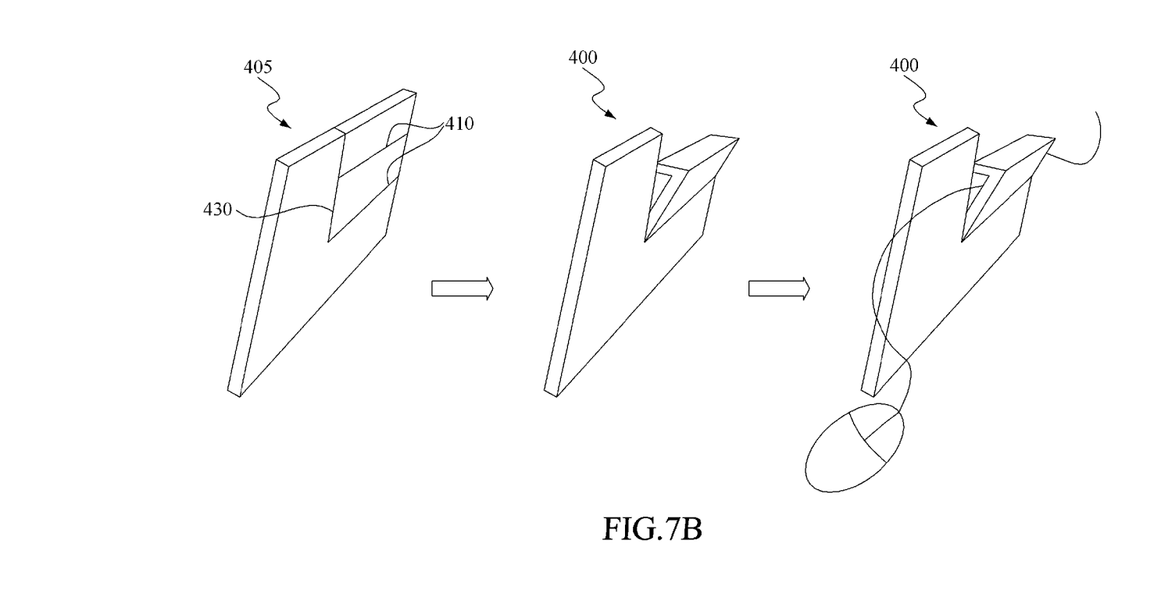

FIG. 7A and FIG. 7B are schematic diagrams of a fifth embodiment for a detachable unit 400 of an electronic device according to the present disclosure. As shown in the figure, the detachable unit 400 includes a carrier frame. The carrier frame is formed by folding a shield 405 along creases 410 and a cutting line 430. The detachable unit 400 is detachably fixed to the casing around the opening, for the user to place an article, such as a common electronic accessory, such as an earphone, or to fix an electronic accessory as a line organizer, such as a cable of a mouse or a keyboard.

Figure 8:
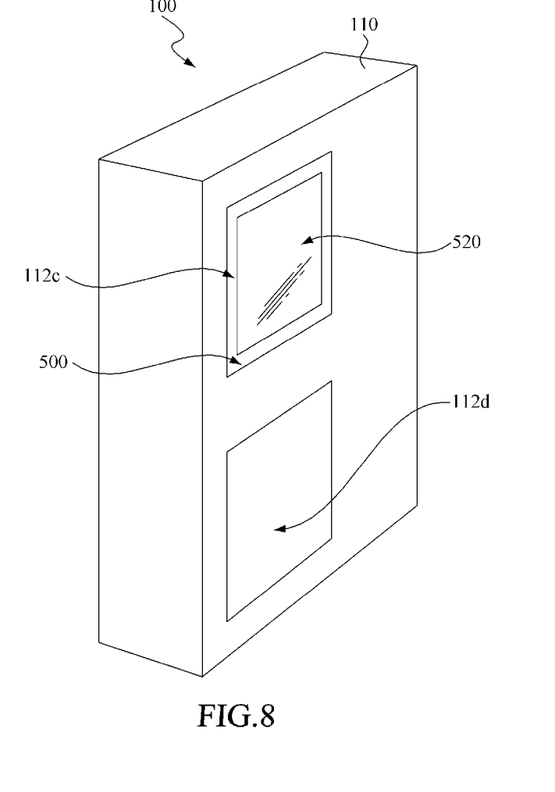
FIG. 8 is a schematic diagram of a sixth embodiment for a detachable unit of an electronic device according to the present disclosure.

FIG. 8 is a schematic diagram of a sixth embodiment for a detachable unit of an electronic device according to the present disclosure. As shown in the figure, a display panel 520, such as a liquid crystal display panel, is provided on the detachable unit 500. When detecting that the detachable unit 500 is installed in the opening 112c or 112d, the electronic device executes a corresponding function, such as to execute a program or adjust a setting. In addition, in other embodiments, other functional modules such as light emitting diodes (LED), organic light emitting diodes, and antennas, are provided on the detachable unit, to enlarge a use range.

In an embodiment, a plurality of detachable units of different types, such as an electromagnetic shielding cover, a cooling module, and a storage module, are prepared corresponding to one opening. In an embodiment, when the user needs to improve a cooling effect of the electronic device, the user selects the cooling module to be installed in the opening. In an embodiment, when the user needs to enlarge storage space of the electronic device, the user selects the storage module to be installed in the opening. In an embodiment, the user selects an electromagnetic shielding cover, to provide better electromagnetic shielding protection.

In an embodiment, openings of the housing are provided according to shapes or sizes of detachable units of different types. In an embodiment, a storage module (such as a solid-state hard disk) usually includes a rectangular appearance. Therefore, a rectangular opening is formed on the housing of the electronic device to install the storage module.

The electronic device of the disclosure includes the detachable unit which not only provides electromagnetic shielding, but also provides various functions, such as cooling, storage, display, communication, and accommodation. A user selects different detachable units according to needs. Therefore, the electronic device provided of the disclosure improves user experience.

Although the present disclosure is disclosed as above by using the embodiments, the embodiments are not intended to limit the present disclosure. A person of ordinary skill in the art may further make variations and improvements without departing from the spirit and scope of the present disclosure. Therefore, the protection scope of the present disclosure should be subject to the claims.

What is claimed is:

1. An electronic device, comprising:
a casing, having an opening; and
a plurality of detachable units, selectively disposed in the opening, wherein each of the detachable units includes a corresponding recognizing element;
wherein at least one of the detachable units is an electromagnetic shielding cover;

wherein the detachable unit comprises a support frame, which is utilized to adjust an inclination angle of the electronic device.

2. The electronic device according to claim 1, further comprising a detector, disposed on the casing to detect the recognizing element.

3. The electronic device according to claim 1, wherein the detachable unit is fixed to the opening in a magnetic or buckled manner.

4. The electronic device according to claim 1, wherein a shape of the detachable unit corresponds to a shape of the opening.

5. The electronic device according to claim 1, wherein at least one of the detachable units is a cooling module or a storage module.

6. The electronic device according to claim 1, wherein the detachable unit comprises a carrier frame, which is detachably fixed to the casing for placing an article.

7. The electronic device according to claim 1, wherein the detachable unit is a folded structure.

\* \* \* \* \*